(12) United States Patent
Lippey et al.

(10) Patent No.: US 7,517,091 B2
(45) Date of Patent: Apr. 14, 2009

(54) COLOR GAMUT IMPROVEMENT IN PRESENCE OF AMBIENT LIGHT

(75) Inventors: Barret Lippey, Belmont, MA (US); Donald E. Nelsen, Winchester, MA (US)

(73) Assignee: Bose Corporation, Framingham, MA (US)

( * ) Notice: Subject to any disclaimer, the term of this patent is extended or adjusted under 35 U.S.C. 154(b) by 442 days.

(21) Appl. No.: 11/127,531

(22) Filed: May 12, 2005

(65) Prior Publication Data

US 2006/0256292 A1   Nov. 16, 2006

(51) Int. Cl.
*G03B 21/14* (2006.01)
(52) U.S. Cl. ............................ 353/84; 353/121; 353/79; 359/449
(58) Field of Classification Search ............ 353/20, 353/84, 79, 121, 122; 349/7, 18; 359/443, 359/449
See application file for complete search history.

(56) References Cited

U.S. PATENT DOCUMENTS

| 1,998,054 | A | 4/1935 | McBurney |
|---|---|---|---|
| 2,590,906 | A | 4/1952 | Tripp |
| 3,314,742 | A | 4/1967 | Morgan |
| 3,556,640 | A | 1/1971 | Austin |
| 3,712,708 | A | 1/1973 | Brown |
| 3,942,869 | A | 3/1976 | Portner et al. |
| RE29,091 | E | 12/1976 | De Palma et al. |
| 4,190,320 | A | 2/1980 | Ferro |
| 4,206,969 | A | 6/1980 | Cobb et al. |
| 4,312,939 | A | 1/1982 | McCole |
| 4,979,803 | A | 12/1990 | McGuckin et al. |
| 5,148,309 | A | 9/1992 | Yamada et al. |
| 5,164,858 | A | 11/1992 | Aguilera et al. |
| 5,193,015 | A | 3/1993 | Shanks |
| 5,214,530 | A | 5/1993 | Coombs et al. |
| 5,335,022 | A | 8/1994 | Braun et al. |
| 5,361,163 | A | 11/1994 | Matsuda et al. |
| 5,383,995 | A | 1/1995 | Phillips et al. |
| 5,389,982 | A | 2/1995 | Lee |
| 5,400,174 | A | 3/1995 | Pagis et al. |

(Continued)

FOREIGN PATENT DOCUMENTS

DE        44 42 045        5/1996

(Continued)

OTHER PUBLICATIONS

High Reflectors. Datasheet [online]. JK Consulting, 2003 [retrieved on Sep. 10, 2007]. Retrieved from the Internet: <URL:http://kruschwitz.com/HR's.htm>.

(Continued)

*Primary Examiner*—William C Dowling
(74) *Attorney, Agent, or Firm*—Fish & Richardson P.C.

(57) ABSTRACT

Methods, apparatus and system for controlling ambient light to produce controlled ambient light having predefined optical spectrum characteristics in order to effect a modified color gamut of a reflected image that is reflected from a surface. The reflected image including reflected portions of the controlled ambient light and reflected portions of a projected image directed from an image projector to the surface. The reflected image having a first color gamut in the presence of uncontrolled ambient light. The reflected image having the modified color gamut in the presence of the controlled ambient light.

41 Claims, 12 Drawing Sheets

U.S. PATENT DOCUMENTS

| | | | |
|---|---|---|---|
| 5,416,617 A | 5/1995 | Loiseaux | |
| 5,473,469 A | 12/1995 | Magocs et al. | |
| 5,486,884 A | 1/1996 | DeVaan | |
| 5,497,207 A | 3/1996 | Kim | |
| 5,521,759 A | 5/1996 | Dobrowolski | |
| 5,526,063 A | 6/1996 | Joubert et al. | |
| 5,568,316 A | 10/1996 | Schenk et al. | |
| 5,570,213 A | 10/1996 | Ruiz et al. | |
| 5,571,624 A | 11/1996 | Phillips et al. | |
| 5,625,494 A | 4/1997 | Fukushima et al. | |
| 5,646,781 A | 7/1997 | Johnson, Jr. | |
| 5,715,083 A | 2/1998 | Takayama | |
| 5,726,805 A | 3/1998 | Kaushik et al. | |
| 5,731,898 A | 3/1998 | Orzi et al. | |
| 5,739,296 A | 4/1998 | Gvon et al. | |
| 5,760,954 A | 6/1998 | Tatsuki et al. | |
| 5,765,934 A | 6/1998 | Okamori et al. | |
| 5,768,019 A | 6/1998 | Niwa et al. | |
| 5,832,146 A | 11/1998 | Bruno | |
| 5,875,012 A | 2/1999 | Crawford et al. | |
| 5,877,895 A | 3/1999 | Shaw et al. | |
| 5,880,800 A | 3/1999 | Mikura et al. | |
| 5,914,817 A | 6/1999 | Browning et al. | |
| 6,018,419 A | 1/2000 | Cobb, Jr. et al. | |
| 6,023,369 A | 2/2000 | Goto | |
| 6,031,653 A | 2/2000 | Wang | |
| 6,072,549 A | 6/2000 | Faris et al. | |
| 6,157,486 A | 12/2000 | Benson et al. | |
| 6,163,402 A | 12/2000 | Chou et al. | |
| 6,183,091 B1 | 2/2001 | Johnson et al. | |
| 6,208,463 B1 | 3/2001 | Hansen et al. | |
| 6,215,592 B1 | 4/2001 | Pelekhaty | |
| 6,248,448 B1 | 6/2001 | Lippey et al. | |
| 6,249,378 B1 | 6/2001 | Shimamura et al. | |
| 6,282,023 B1 | 8/2001 | Bergman | |
| 6,284,382 B1 | 9/2001 | Ishikawa et al. | |
| 6,288,172 B1 | 9/2001 | Goetz et al. | |
| 6,288,842 B1 | 9/2001 | Florczak et al. | |
| 6,307,675 B1 | 10/2001 | Abe et al. | |
| 6,317,189 B1 | 11/2001 | Yuan et al. | |
| 6,339,464 B1 | 1/2002 | Anderson et al. | |
| 6,375,330 B1 | 4/2002 | Mihalakis | |
| 6,381,068 B1 | 4/2002 | Harada et al. | |
| 6,391,068 B2 | 5/2002 | Yoshida et al. | |
| 6,392,766 B1 | 5/2002 | Gnaedig et al. | |
| 6,398,389 B1 | 6/2002 | Bohler | |
| 6,414,727 B1 | 7/2002 | Benton | |
| 6,421,174 B1 | 7/2002 | Ooshima et al. | |
| 6,428,169 B1* | 8/2002 | Deter et al. | 353/20 |
| 6,449,089 B1 | 9/2002 | Moshrefzadeh et al. | |
| 6,525,877 B1 | 2/2003 | Clabburn et al. | |
| 6,529,322 B1 | 3/2003 | Jones et al. | |
| 6,530,667 B1 | 3/2003 | Idaszak et al. | |
| 6,561,654 B2 | 5/2003 | Mukawa et al. | |
| 6,590,710 B2 | 7/2003 | Hara et al. | |
| 6,618,199 B2 | 9/2003 | Cook | |
| 6,650,455 B2 | 11/2003 | Miles | |
| 6,674,562 B1 | 1/2004 | Miles | |
| 6,680,792 B2 | 1/2004 | Miles | |
| 6,688,747 B2 | 2/2004 | Wichner et al. | |
| 6,733,139 B2 | 5/2004 | Childers | |
| 6,769,774 B2 | 8/2004 | McDowell | |
| 6,810,751 B2 | 11/2004 | Moreno et al. | |
| 6,831,784 B2 | 12/2004 | Takeda | |
| 6,894,835 B2 | 5/2005 | Ohsako et al. | |
| 6,956,702 B2 | 10/2005 | Pate | |
| 6,969,177 B2 | 11/2005 | Li et al. | |
| 6,988,806 B2 | 1/2006 | Slobodin et al. | |
| 7,035,006 B2 | 4/2006 | Umeya et al. | |
| 7,035,015 B2 | 4/2006 | Teijido | |
| 7,040,764 B2* | 5/2006 | Przybyla et al. | 353/84 |
| 7,090,357 B2 | 8/2006 | Magarill et al. | |
| 7,234,817 B2* | 6/2007 | Paukshto | 353/20 |
| 2001/0011779 A1 | 8/2001 | Stover | |
| 2002/0015215 A1 | 2/2002 | Miles | |
| 2002/0024711 A1 | 2/2002 | Miles | |
| 2002/0043157 A1 | 4/2002 | Pillion et al. | |
| 2002/0044445 A1 | 4/2002 | Bohler et al. | |
| 2002/0063350 A1 | 5/2002 | Matsumoto | |
| 2002/0075555 A1 | 6/2002 | Miles | |
| 2002/0126354 A1 | 9/2002 | Jeong | |
| 2002/0130994 A1 | 9/2002 | Karman | |
| 2002/0145708 A1 | 10/2002 | Childers et al. | |
| 2002/0186349 A1 | 12/2002 | Wichner | |
| 2003/0002016 A1 | 1/2003 | Sellen et al. | |
| 2003/0043346 A1 | 3/2003 | Kwok et al. | |
| 2003/0117704 A1 | 6/2003 | Lippey et al. | |
| 2003/0128427 A1 | 7/2003 | Kalmanash et al. | |
| 2003/0128430 A1 | 7/2003 | Leu et al. | |
| 2003/0156326 A1 | 8/2003 | Lotz et al. | |
| 2003/0156328 A1 | 8/2003 | Goto et al. | |
| 2003/0179346 A1 | 9/2003 | Mihara | |
| 2003/0214632 A1 | 11/2003 | Ma et al. | |
| 2003/0214633 A1 | 11/2003 | Roddy et al. | |
| 2004/0061935 A1 | 4/2004 | Ohsako et al. | |
| 2004/0150883 A1 | 8/2004 | Shimoda et al. | |
| 2004/0196551 A1 | 10/2004 | Chubachi et al. | |
| 2004/0212895 A1 | 10/2004 | Pate | |
| 2004/0233524 A1 | 11/2004 | Lippey et al. | |
| 2004/0240053 A1 | 12/2004 | Shimoda | |
| 2005/0030480 A1 | 2/2005 | Lippey | |
| 2005/0105176 A1 | 5/2005 | Lippey et al. | |
| 2005/0207002 A1 | 9/2005 | Liu et al. | |
| 2005/0231800 A1 | 10/2005 | Lippey | |
| 2005/0241530 A1 | 11/2005 | Bruckner et al. | |

FOREIGN PATENT DOCUMENTS

| | | |
|---|---|---|
| DE | 197 47 597 | 8/1998 |
| DE | 199 01 970 | 8/2000 |
| EP | 0 442 738 | 8/1991 |
| EP | 0 490 391 | 6/1992 |
| EP | 0 493 863 | 7/1992 |
| EP | 0 551 127 | 7/1993 |
| EP | 0 609 593 | 12/1995 |
| EP | 0 833 172 | 4/1998 |
| EP | 0 856 768 | 8/1998 |
| EP | 0 648 048 | 1/2002 |
| EP | 0 657 769 | 1/2002 |
| EP | 1 324 114 | 7/2003 |
| EP | 1 341 387 | 9/2003 |
| GB | 511199 | 8/1939 |
| GB | 652859 | 5/1951 |
| GB | 2 161 983 | 1/1986 |
| GB | 2 388 992 | 11/2003 |
| JP | S56-47012 | 4/1981 |
| JP | 62-178906 | 8/1987 |
| JP | 04-219745 | 8/1992 |
| JP | 05-011344 | 1/1993 |
| JP | 05-216123 | 8/1993 |
| JP | S06-043544 | 2/1994 |
| JP | 06-082747 | 3/1994 |
| JP | H06-148409 | 5/1994 |
| JP | 06-289491 | 10/1994 |
| JP | 07-503348 | 4/1995 |
| JP | 07-152088 | 6/1995 |
| JP | 07-261274 | 10/1995 |
| JP | 07-270915 | 10/1995 |
| JP | 08-186849 | 7/1996 |
| JP | 10-312027 | 11/1998 |
| JP | 11-174232 | 7/1999 |
| JP | H11-119002 | 8/1999 |
| JP | 2000-284908 | 10/2000 |
| JP | 2001-005412 | 1/2001 |

| | | |
|---|---|---|
| JP | 2001-055646 | 2/2001 |
| JP | 2001-264750 | 9/2001 |
| JP | 2001-305649 | 11/2001 |
| JP | 2003-050306 | 2/2003 |
| JP | 2003-121637 | 4/2003 |
| JP | 2003-248108 | 9/2003 |
| JP | 2003-337381 | 11/2003 |
| JP | 2004-004821 | 1/2004 |
| JP | 2004-029163 | 1/2004 |
| JP | 2004-029267 | 1/2004 |
| JP | 2004-038002 | 2/2004 |
| JP | 2004-038003 | 2/2004 |
| JP | 2004-061545 | 2/2004 |
| JP | 2004-101558 | 4/2004 |
| JP | 2004-117480 | 4/2004 |
| JP | 2004-138938 | 5/2004 |
| JP | 2004-144882 | 5/2004 |
| JP | 2004-144883 | 5/2004 |
| JP | 2004-163806 | 6/2004 |
| JP | 2004-170959 | 6/2004 |
| WO | WO 93/15585 | 8/1993 |
| WO | WO 95/17690 | 6/1995 |
| WO | WO96/32663 | 10/1996 |
| WO | WO 97/01610 | 1/1997 |
| WO | WO 98/36320 | 8/1998 |
| WO | WO 00/41009 | 7/2000 |
| WO | WO 00/45220 | 8/2000 |
| WO | WO 00/57214 | 9/2000 |
| WO | WO 03/034145 | 4/2003 |
| WO | WO 03/050612 | 6/2003 |
| WO | WO 03/077027 | 9/2003 |
| WO | WO 03/077028 | 9/2003 |
| WO | WO 2004/031852 | 4/2004 |

OTHER PUBLICATIONS

Shimoda, K., "Multi-Layer Dichroic Coating on Plastic Webs," Proc. of 13th Int'l. Conf. on Vacuum Web Coating, (Oct. 17-19, 1999), pp. 58-67.

Lotz, H. et al., "Thick Optical Multi-Layer Systems on PET Film," Precision, Nov. 2001, [retrieved on Mar. 12, 2002]. Retrieved from the Internet: <URL: http://www.appliedfilms.com/Precision3/14_multilayer$_{13}$ systems/multilayer$_{13}$ systems_print.htm>.

Young, L., Multilayer Interference Filters with Narrow Stop Bands:, Applied Optics, vol. 6(2), pp. 297-312 (Feb. 1967).

Pelletier et al., "Interference Filters with Multiple Peaks", J. Opt. Soc. Am., vol. 72(6), pp. 683-687 (Jun. 1982).

Partial European Search Report dated Mar. 20, 2003 from European Application No. 02102872.5.

European Search Report dated Mar. 30, 2003 from European Application No. 02102872.5.

Examination Report dated Mar. 1, 2004 from European Application No. 02102872.5.

EP Examination Report in Application No. 02102872.5, dated Oct. 18, 2004.

EP Examination Report in Application No. 02102872.5, dated May 13, 2005.

Partial European Search Report dated Jun. 14, 2005 from European Application No. 05101098.1.

EP Examination Report in Application No. 05101098.1, dated Oct. 6, 2005.

EP Examination Report in Application No. 02102872.5, dated Mar. 17, 2006.

International Search Report in corresponding Application No. PCT/US2006/000493, dated Jun. 16, 2006.

EP Examination Report in Application No. 05101098.1, dated Feb. 16, 2007.

EP Search Report in Application No. 05101103.9 dated Mar. 12, 2007.

EP Partial Search Report in Application No. 07102106.7, dated May 18, 2007.

CN Office Action in Application No. 02157897.4, dated Jun. 8, 2007.

European Search Report dated Jul. 17, 2007 from European Application No. 05101103.9.

International Preliminary Report on Patentability in corresponding Application No. PCT/US2006/000493, dated Jul. 10, 2007.

EP Search Report in Application No. 07102106.7, dated Oct. 31, 2007.

JP Examination Report in Application No. 2002-371849, dated Mar. 27, 2008.

IN Examination Report in Application No. 1064/MUM/2002, dated Apr. 10, 2008.

Examination Report dated May 19, 2008 from European Application No. 05101098.1.

Action and Response History retrieved from PAIR for U.S. Appl. No. 10/028,063, through May 29, 2008.

Action and Response History retrieved from PAIR for U.S. Appl. No. 10/931,608, through May 29, 2008.

Action and Response History retrieved from PAIR for U.S. Appl. No. 11/033,214, through May 29, 2008.

Action and Response History retrieved from PAIR for U.S. Appl. No. 11/548,373, through May 29, 2008.

Action and Response History retrieved from PAIR for U.S. Appl. No. 10/893,461, through May 29, 2008.

Action and Response History retrieved from PAIR for U.S. Appl. No. 10/789,695, through Jun. 3, 2008.

International Search Report & Written Opinion in Application No. PCT/US2008/058644, dated Jun. 23, 2008.

Office Action in Japanese Application No. 2005-52083, dated Sep. 2, 2008.

Examination Report from European Application No. 05101098.1, dated May 19, 2008.

\* cited by examiner

| Layer | Material | Thickness (nm) |
|---|---|---|
| | Substrate | |
| 1 | $TiO_2$ | 51.4 |
| 2 | $SiO_2$ | 90.0 |
| 3 | $TiO_2$ | 9.8 |
| 4 | $SiO_2$ | 40.6 |
| 5 | $TiO_2$ | 57.7 |
| 6 | $SiO_2$ | 88.1 |
| 7 | $TiO_2$ | 52.1 |
| 8 | $SiO_2$ | 83.9 |
| 9 | $TiO_2$ | 44.5 |
| 10 | $SiO_2$ | 54.0 |
| 11 | $TiO_2$ | 39.1 |
| 12 | $SiO_2$ | 77.7 |
| 13 | $TiO_2$ | 50.2 |
| 14 | $SiO_2$ | 45.4 |
| 15 | $TiO_2$ | 21.4 |
| 16 | $SiO_2$ | 79.1 |
| 17 | $TiO_2$ | 52.0 |
| 18 | $SiO_2$ | 86.4 |
| 19 | $TiO_2$ | 50.5 |
| | Air | |

# COLOR GAMUT IMPROVEMENT IN PRESENCE OF AMBIENT LIGHT

TECHNICAL FIELD

This description relates to color gamut improvement of image projection systems in the presence of ambient light.

BACKGROUND

Image projectors fall into two general categories, front projectors and rear projectors, for use in, e.g., home cinema and business applications. The image projectors modulate pre-selected color spectral bands of visible light (e.g., red light, blue light, and green light) to form images on surfaces, e.g., display screens. Generally, front projectors illuminate a diffusive display screen that reflects light into the viewer's eyes, and rear projectors illuminate a diffusive display screen to display an image that is viewed from the side of the screen that is opposite the projector.

A front-projection diffusive display screen may include a triple-reflector light filter surface that selectively reflects pre-selected color spectral bands of visible light, while absorbing substantially all of the ambient light, other than the light corresponding to the pass bands of the triple reflector filter, that impinges on the screen. The wavelength-selective display screen reduces the effects of ambient light on image quality.

SUMMARY

In general, in one aspect, the invention features a method including controlling ambient light to produce controlled ambient light having predefined optical spectrum characteristics in order to effect a modified color gamut of a reflected image that is reflected from a surface that reflects light of substantially all wavelengths. The reflected image includes reflected portions of the controlled ambient light and reflected portions of a projected image directed from an image projector to the surface. The reflected image has a first color gamut in the presence of uncontrolled ambient light. The reflected image has the modified color gamut in the presence of the controlled ambient light.

Implementations may include one or more of the following features. The modified color gamut is larger than the first color gamut. The controlled ambient light effects the modified color gamut of the reflected image by increasing, relative to other color spectral bands, light intensity of preselected color spectral bands of the reflected image. The preselected color spectral bands are separated in a light spectrum. The preselected color spectral bands include a first color spectral band centered at about 485 nm and a second color spectral band centered at about 580 nm. The light intensity of the preselected color spectral bands are increased non-uniformly relative to each other.

The projected image includes light of predetermined color spectral bands. The projected image includes light in a blue spectral band, light in a green spectral band, and light in a red spectral band.

The method of controlling the ambient light includes filtering light from an ambient light source to produce the controlled ambient light. The light from the ambient light source may be filtered by an interference filter. The light from the ambient light source may be filtered by a linear filter.

In general, in another aspect, the invention features a system including a surface that reflects light of substantially all wavelengths, an image projector to provide a projected image, and an element to control ambient light, from an ambient light source, to provide controlled ambient light having predefined optical spectrum characteristics in order to effect a modified color gamut of a reflected image that is reflected from the surface. The reflected image includes reflected portions of the controlled ambient light and reflected portions of the projected image directed from the image projector to the surface. The reflected image has a first color gamut in the presence of uncontrolled ambient light. The reflected image has a modified color gamut in the presence of the controlled ambient light.

Implementations may include one or more of the following features. The modified color gamut is larger than the first color gamut. The element is substantially transmissive to ambient light of two color spectral bands that are separated in a light spectrum and is substantially non-transmissive of ambient light of other color spectral bands. The element is substantially transmissive to ambient light of a cyan spectral band and ambient light of a yellow spectral band. The element includes an interference filter having a multilayer coating. The element includes a linear filter having a transmission rate that varies according to color spectral band. The element controls the ambient light so as to produce controlled ambient light having color point chromaticity coordinates within predetermined ranges. A color point x chromaticity coordinate is within a range of 0.3<x<0.5. A color point y chromaticity coordinate is within 0.5 units of a black body curve.

In general, in another aspect, the invention features a method including controlling ambient light to produce controlled ambient light having color point chromaticity coordinates within a predetermined range in order to effect a modified color gamut of a reflected image that is reflected from a surface. The reflected image includes reflected portions of the controlled ambient light and reflected portions of a projected image directed from an image projector to the surface. The reflected image has a first color gamut in the presence of uncontrolled ambient light. The reflected image has the modified color gamut in the presence of the controlled ambient light.

Implementations may include one or more of the following features. A color point x chromaticity coordinate is within a range of 0.3<x<0.5. A color point y chromaticity coordinate is within 0.5 units of a black body curve. The modified color gamut is larger than the first color gamut. The controlled ambient light effects the modified color gamut of the reflected image by increasing, relative to other color spectral bands, light intensity of preselected color spectral bands of the reflected image. The preselected color spectral bands are separated in a light spectrum. The preselected color spectral bands include a first color spectral band centered at about 485 nm and a second color spectral band centered at about 580 nm. The light intensity of the preselected color spectral bands are increased non-uniformly relative to each other.

The projected image includes light of predetermined color spectral bands. The projected image includes light in a blue spectral band, light in a green spectral band, and light in a red spectral band.

The method of controlling the ambient light includes filtering light from an ambient light source to produce the controlled ambient light. The light from the ambient light source is filtered by an interference filter. The light from the ambient light source is filtered by a linear filter. The surface may reflect light of substantially all wavelengths. The surface may include a projection screen having a wavelength-selective reflective surface that reflects substantially all incident light in preselected color spectral bands.

In general, in another aspect, the invention features a system including an image projector to provide projected light; and an element to control ambient light to produce controlled ambient light having color point chromaticity coordinates within a predetermined range in order to effect a modified color gamut of a reflected image that is reflected from a surface. The reflected image includes reflected portions of the controlled ambient light and reflected portions of a projected image directed from an image projector to the surface. The reflected image has a first color gamut in the presence of uncontrolled ambient light. The reflected image has the modified color gamut in the presence of the controlled ambient light.

Implementations may include one or more of the following features. A color point x chromaticity coordinate is within a range of 0.3<x<0.5. A color point y chromaticity coordinate is within 0.5 units of a black body curve. The modified color gamut is larger than the first color gamut. The element is substantially transmissive to ambient light of two color spectral bands that are separated in a light spectrum and is substantially non-transmissive of ambient light of other color spectral bands. The element is substantially transmissive to ambient light of a cyan spectral band and ambient light of a yellow spectral band. The element includes an interference filter having a multilayer coating. The element includes a linear filter having a transmission rate that varies according to color spectral band. The surface reflects light of substantially all wavelengths. The surface includes a projection screen having a wavelength-selective reflective surface that reflects substantially all incident light in preselected color spectral bands.

Advantages that can be seen in particular implementations of the invention include one or more of the following. By filtering the ambient light present in a room in which an image projector directs a projected image onto a conventional white or gray screen, the color gamut of a reflected image that includes reflected portions of the controlled ambient light and reflected portions of the projected image can be improved to enable presentation of saturated colors on the yellow side of the color gamut triangle, particularly the colors of yellow green, greenish yellow, yellow, orange yellow, orange, and yellowish pink. Different filters and types of filters may be used depending on the ambient light source. In the case of artificial light sources having a small surface area, such as a tungsten filament lamp, filters can be deposited directly on the bulbs themselves or on a glass or plastic substrate which is placed over or in front of the bulb. Where the ambient light source covers a larger surface area, for example a window of a room, filters can be constructed in large sheets with a batch or roll-coating process and applied to the windows. One implementation includes all of the foregoing advantages.

The details of one or more examples are set forth in the accompanying drawings and the description below. Further features, aspects, and advantages of the invention will become apparent from the description, the drawings, and the claims.

DETAILED DESCRIPTION

Figure 1:
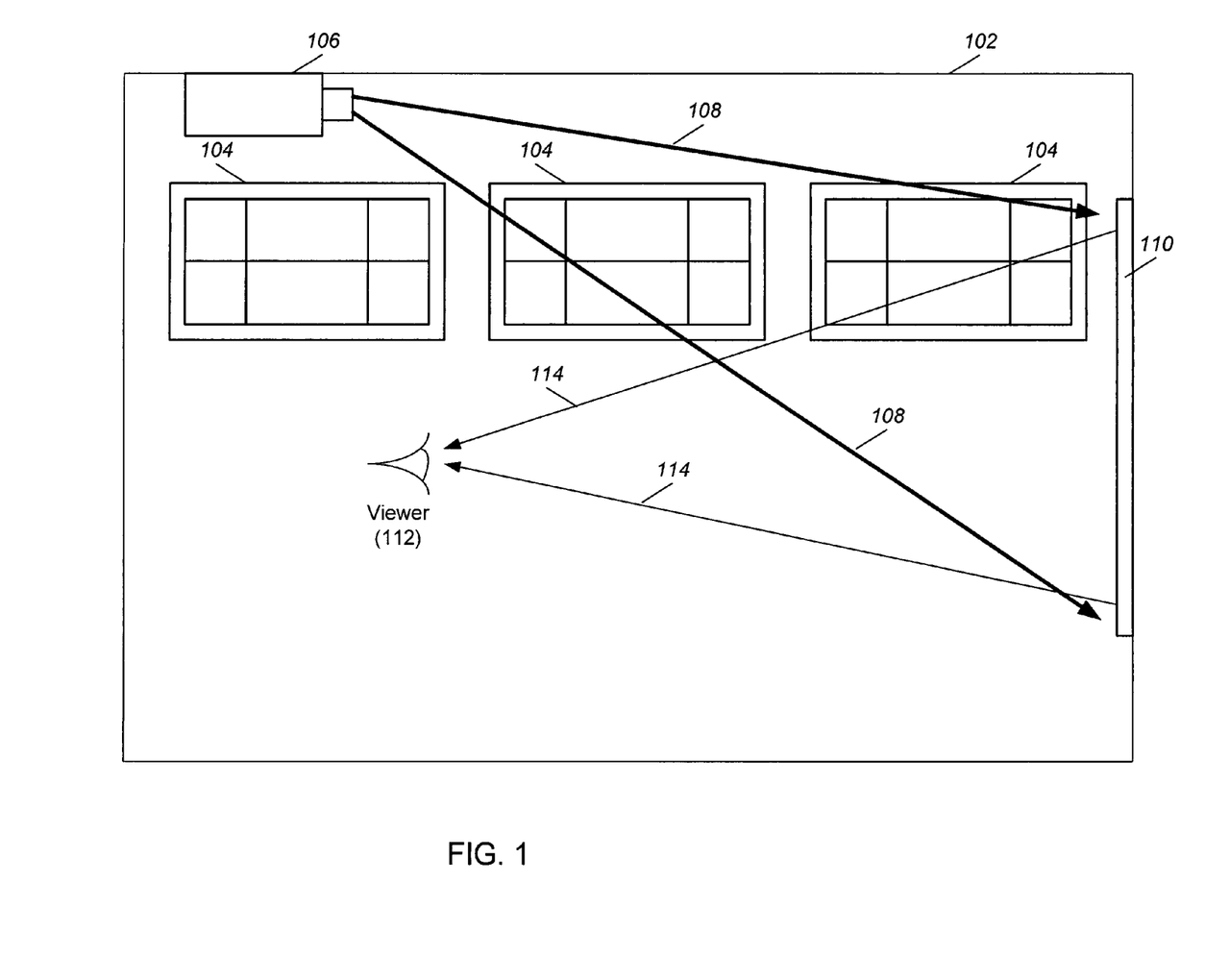
FIG. 1 shows a projection system used in a room.

As shown in FIG. 1, a projection system set up in a home theater environment is located in a room 102 with windows 104. The projection system includes an image projector 106 that directs a projected image 108 onto an image forming surface, e.g., a projection screen 110. The projection screen 110 can be of the type that includes a reflective surface that reflects light of substantially all wavelengths to a viewer's eyes 112, or a reflective surface that is wavelength-selective. The reflected light 114 includes (and thus the viewer's eye receives as a reflected image) both the reflected portions of the projected image and the reflected portions of the ambient light present in the room 102.

Generally, the term "ambient light" refers to light from an ambient light source, such as daylight streaming through a window 104 of the room 102. At times in this description, it will be useful to distinguish between light from the ambient light source having its intrinsic optical spectrum and light from the ambient light source having a modified optical spectrum. In these situations, the term "uncontrolled ambient light" will refer to light from the ambient light source having its intrinsic optical spectrum and the term "controlled ambient light" will refer to light from the ambient light source having a modified optical spectrum.

Figure 2:
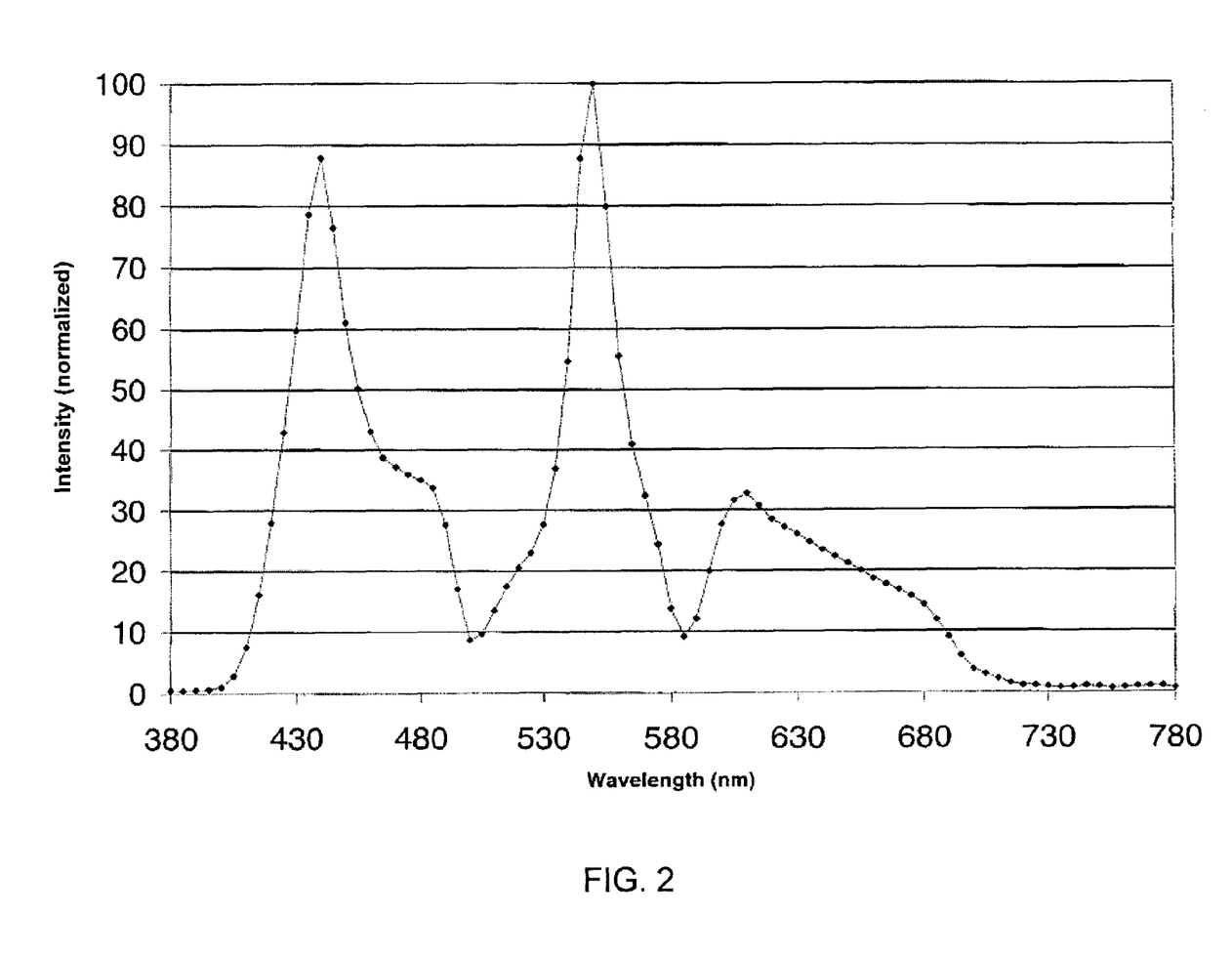
FIG. 2 shows an intrinsic optical spectrum of an image projector.

The image projector 106 has an intrinsic optical spectrum that represents the intensity distribution of light in each color spectral band (e.g., a blue spectral band centered at about 470 nm, a green spectral band centered at about 550 nm, and a red spectral band centered at about 625 nm) when each color channel (e.g., a blue channel, a green channel, and a red channel) of the image projector is modulating light at 100% signal strength. The intrinsic optical spectrum of the projector 106 is typically adjusted by its manufacturer to be appropriate for its primary applications. For example, image projectors for use in a home theater environment typically do not have a large yellow peak at approximately 580 nm. FIG. 2 shows an intrinsic optical spectrum for a particular example image projector 106, namely a PLZ-933 image projector, manufactured by Primax Display Corporation.

Figure 3:
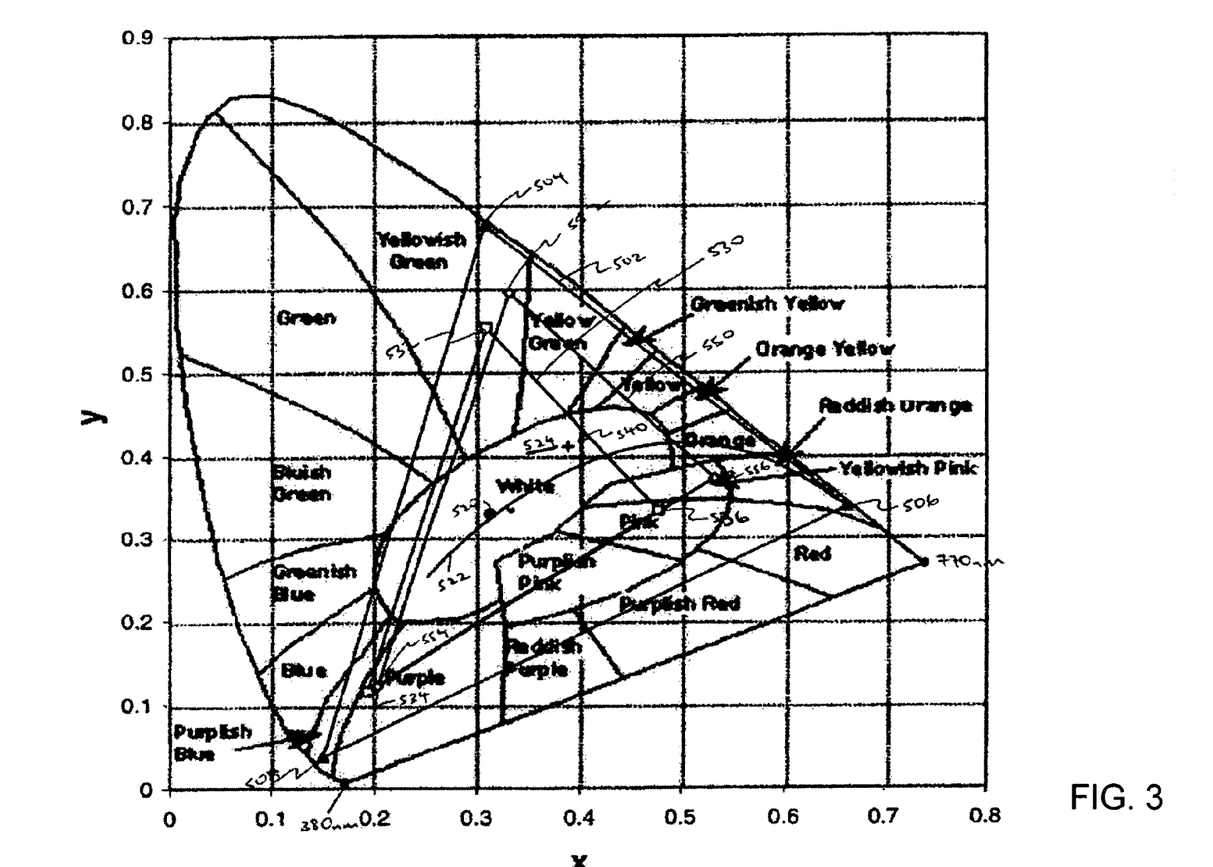
FIG. 3 shows a Commission Internationale de l'Eclairage ("CIE") 1931 chromaticity chart.

Referring to FIG. 3, a Commission Internationale de l'Eclairage ("CIE") 1931 chromaticity chart shows the range of colors perceivable by the human eye, that is represented in two dimensions, x and y. Due to physical constraints, the images projected by the image projector 106 to the screen have only a subset of all of the human-perceivable colors. Such a subset is referred to as the intrinsic color gamut of images projected by the image projector and is often represented in the CIE chromaticity chart by a triangle, in this example triangle 502 having vertices 504, 506, 508. The vertices of a color gamut triangle represent the three primary colors of red, green, and blue. In this case, each vertex of the intrinsic color gamut triangle 502 can be found by sequentially turning on only one color channel of the projector 106 to 100% signal strength and measuring the light that is reflected from the screen 110.

The color gamut of the reflected image as presented to the eye of a viewer is affected by the ambient light that is reflected to the viewer's eye along with the projected image from the projector. When the room is dark, the color gamut is substantially the same as the intrinsic color gamut of the projector 106, assuming that the screen does not impart any alteration to the optical spectrum of reflected image that is received by the viewer's eye. Accordingly, the color gamut in the absence of ambient light is also indicated by triangle 502.

Figure 4:
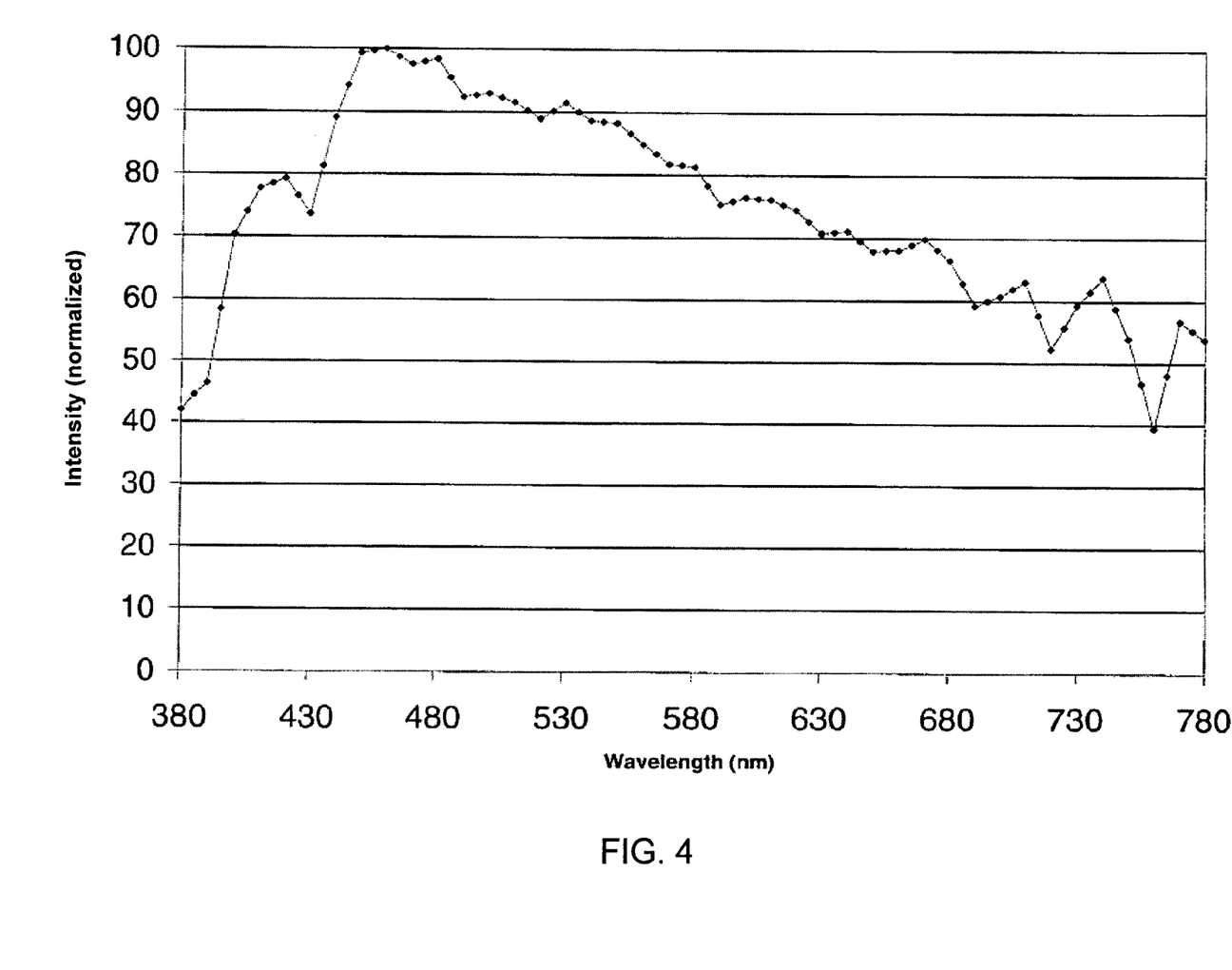
FIG. 4 shows an optical spectrum of ambient light closely approximating CIE Illuminant D65 light.

CIE Illuminant D65 is defined to be a simulation of sunlight with a color temperature of 6500 Kelvin. Suppose, for example, that the uncontrolled ambient light entering the room 102 through the windows 104 has an optical spectrum that closely approximates CIE Illuminant D65 (FIG. 4), and chromaticity coordinates of x=0.313, y=0.329 (represented by a "•" symbol 520 in FIG. 3). The color point of the uncontrolled ambient light falls close to a curved line 522 commonly referred to as the "black body curve." The black body curve represents all the visible colors that can be emitted from a black object as it is heated through various temperatures. These colors include red, orange, white, and bluish white. It is desirable for ambient room lighting to be as close as possible to the black body curve and in the region marked "white" in FIG. 3. This will help objects in the room to appear in their natural colors.

Figure 5:
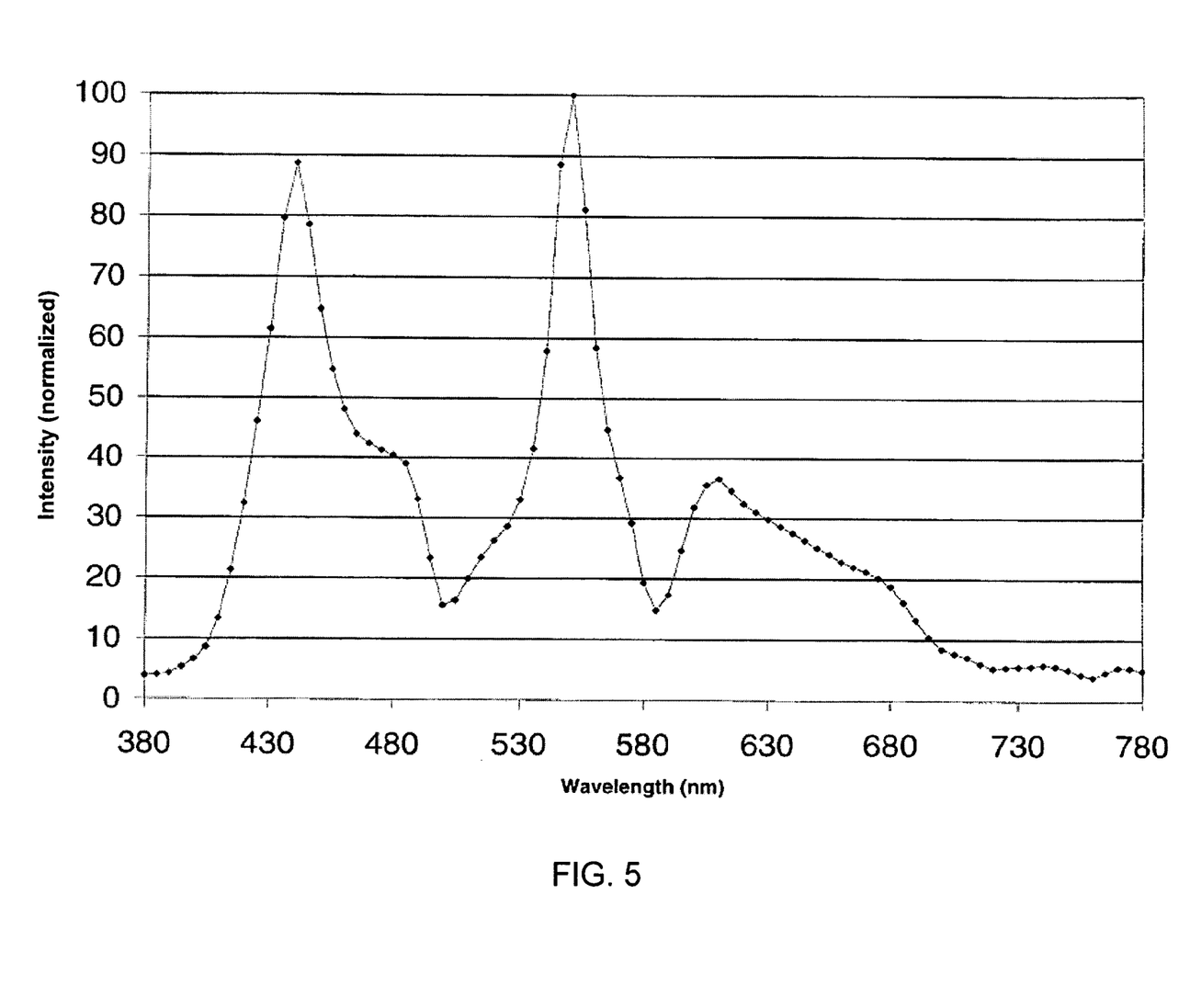
FIG. 5 shows an optical spectrum of a reflected image in the presence of uncontrolled ambient light.

When light projected by the PLZ-933 image projector 106 is in the presence of such uncontrolled ambient light, e.g., the projected light luminance relative to the uncontrolled ambient light luminance is at a 5:1 ratio, the optical spectrum of the reflected image (i.e., the combined projected image and uncontrolled ambient light reflected by the screen 110 to the eye of the viewer) is as shown in FIG. 5. The intensity of light in certain color spectral bands of the optical spectrum curve in FIG. 5 is relatively higher than that in FIG. 2. The corresponding color gamut of the reflected image is depicted in FIG. 3 by a triangle 530 graphed with open squares at its vertices 532, 534, 536. As can be seen, the color gamut of the reflected image in the presence of the uncontrolled ambient light has less area (and is therefore smaller) than in the absence of any ambient light. The effect of this reduction in area size is that, to the viewer 112, colors of a reflected image (especially in the yellow-orange parts of the color gamut) appear less saturated when the reflected image is in the presence of the uncontrolled ambient light.

This color desaturation can be eliminated, of course, by projecting the image onto the projection screen 110 in a totally darkened room 102. However, this may be hard to achieve in a room 102 with windows 104, such as that shown in FIG. 1, even if blinds, curtains, or other window coverings are placed over the windows 104. Furthermore, viewers 112 generally prefer to have some ambient light in the room 102 to reduce eye strain and fatigue that results from the high contrast of a pitch-dark room 102 and a bright image. Also, the presence of ambient light in the room is useful while performing activities other than watching the reflected image.

One approach to reducing the amount by which the color gamut of the reflected image is made smaller in the presence of ambient light involves controlling the ambient light to have predefined optical spectrum characteristics in order to effect a desired modification of the reflected image's optical spectrum. In some implementations, this can be done by filtering the uncontrolled ambient light that enters the room 102 through the windows 104 to reduce the relative intensity of preselected color spectral bands of the uncontrolled ambient light so that certain colors of a reflected image appear to be more saturated when reflected from the projection screen 110. While filtering the uncontrolled ambient light to provide controlled ambient light may have the desired effect on the color gamut of the reflected image, the viewer's visual experience is also affected by other factors, e.g., the color of the controlled ambient light in the room 102 and the decrease in brightness due to the filtering. Accordingly, it may be preferable to the viewer 112 if the controlled ambient light appears to have a similar color and brightness as the uncontrolled ambient light. In one example, if the filter controls the ambient light so that the resulting color point y chromaticity coordinate value is within 0.5 units of the black body curve and the color point x chromaticity coordinate value is between approximately 0.3 and 0.5, the color of the controlled ambient light and objects in the room will appear to be reasonably similar to other natural lighting sources, such as sunlight and tungsten filament lights.

A variety of filters can be used to control the ambient light to produce controlled ambient light having predefined optical spectrum characteristics, e.g., the color point of the controlled ambient light is located in the desired region of the chromaticity chart close to the black body curve. The filters can be permanently or removably affixed to each of the windows 104 of the room 102 shown in FIG. 1.

Figure 6:
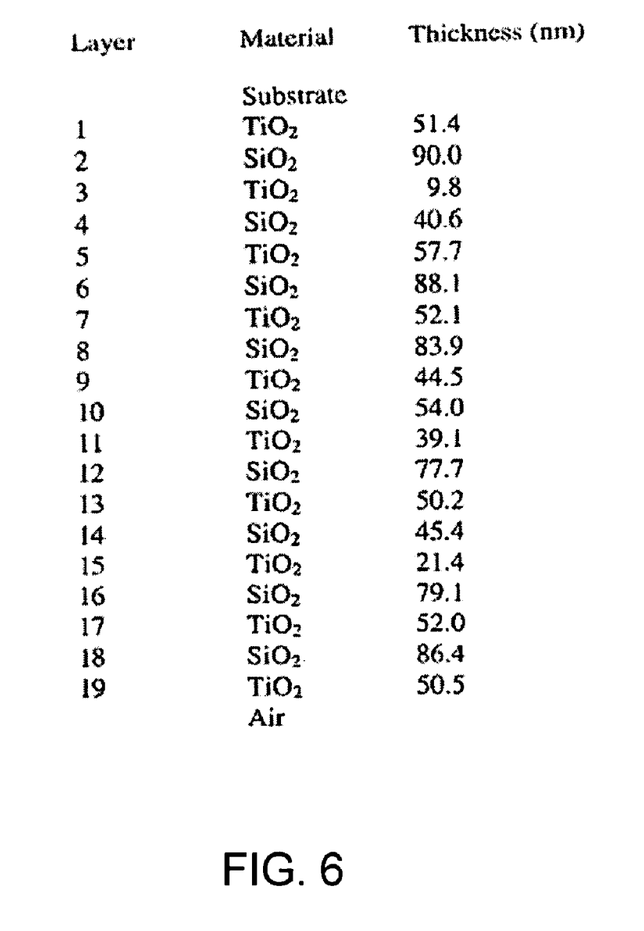
FIG. 6 is a table of an example multilayer coating.
Figure 7:
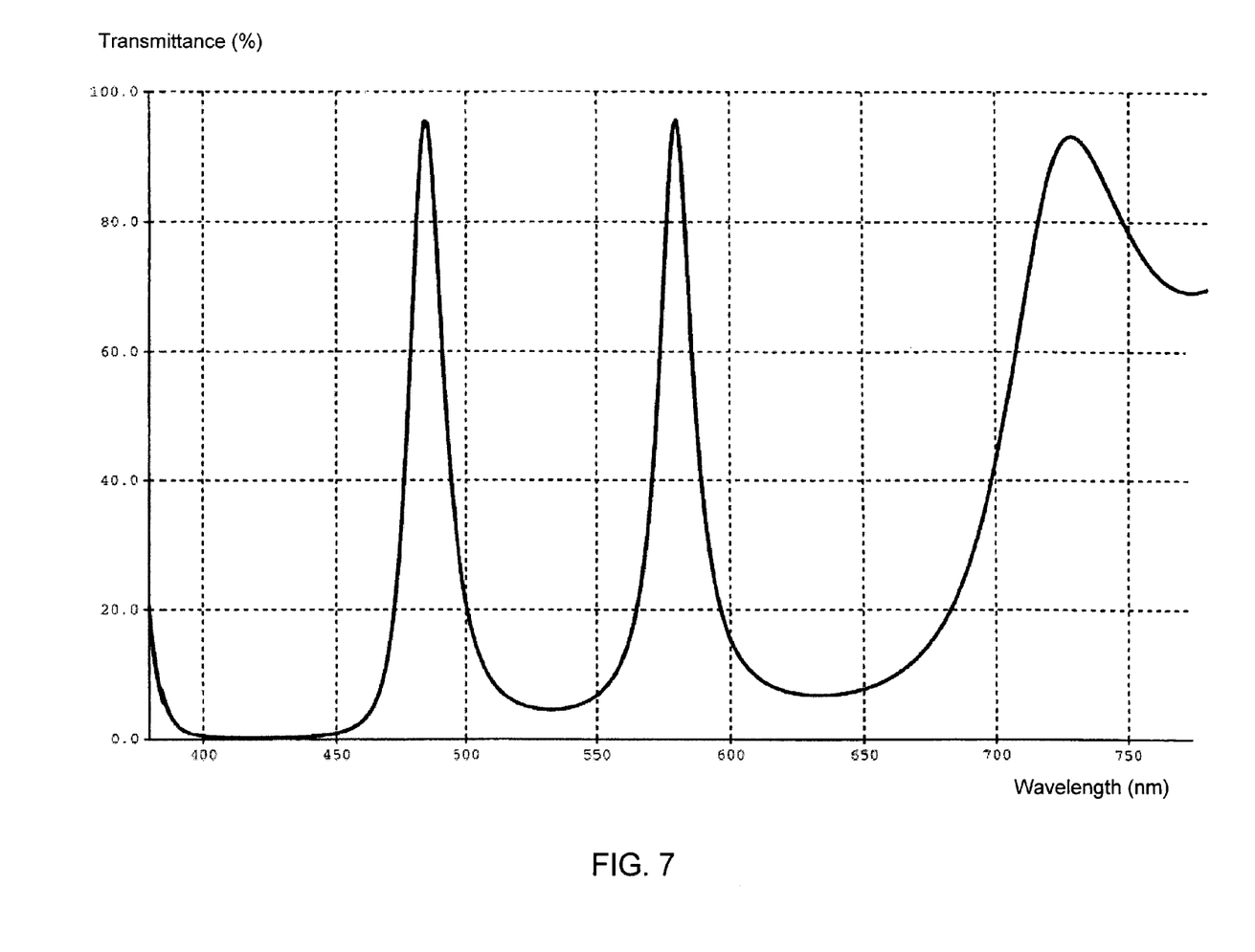
FIG. 7 shows a transmission curve of an interference filter having the example multilayer coating of FIG. 6.
Figure 8:
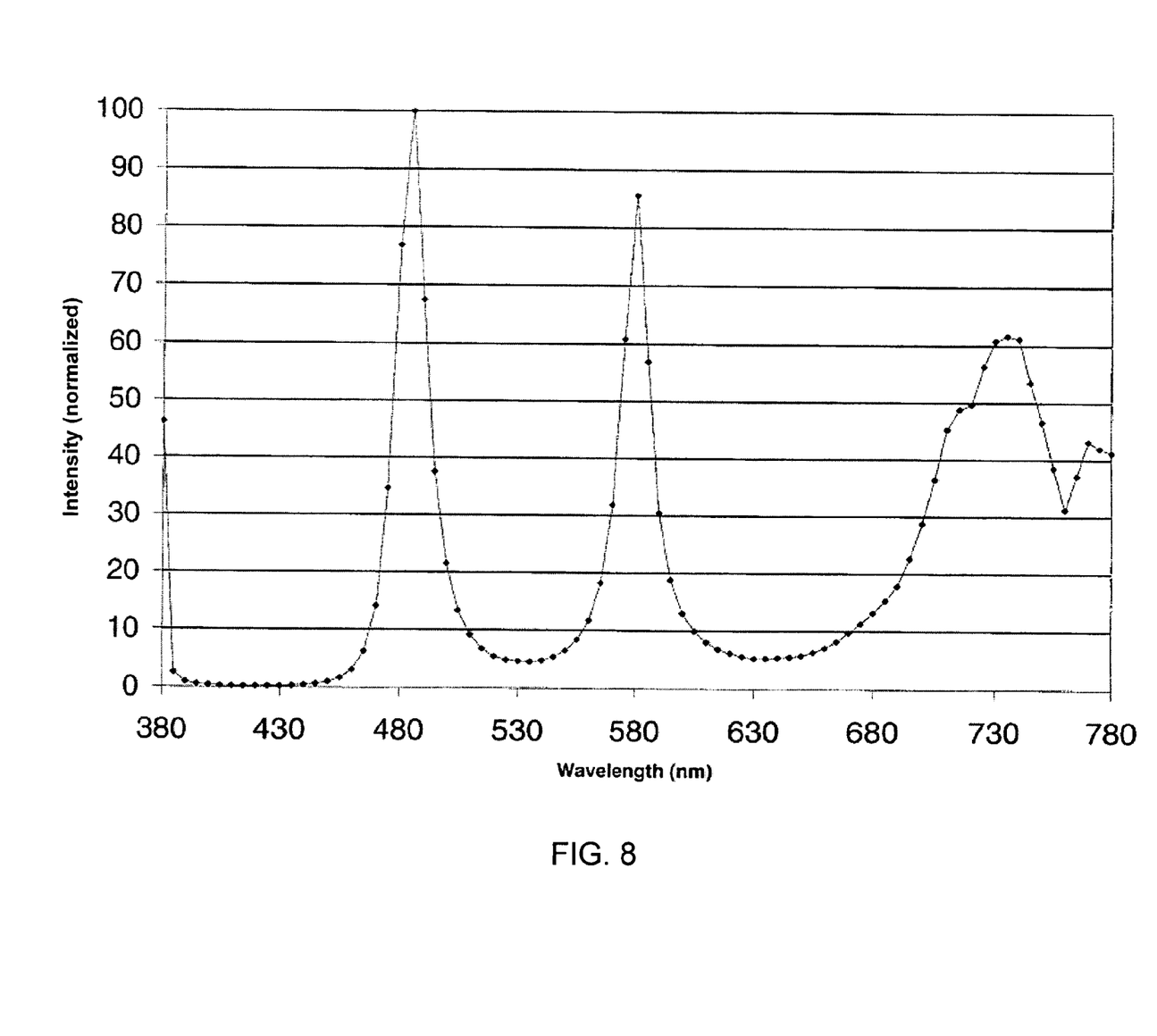
FIG. 8 shows an optical spectrum of ambient light filtered by the interference filter of FIG. 7.

In some examples, the filter affixed to a window 104 is an interference filter having a multilayer coating. FIG. 6 shows a table illustrating an example of a multilayer coating having 19 layers of the indicated materials and indicated thicknesses. The coating in the table of FIG. 6 is constructed and arranged so that the interference filter reduces the relative intensity of light in all color spectral bands other than the cyan spectral band centered at about 485 nm and the yellow spectral band centered at about 580 nm, as shown in FIG. 7. The resulting color point of the controlled ambient light ("interference filter-controlled ambient light") has chromaticity coordinates of x=0.385, y=0.404, and is represented in FIG. 3 by a "+" symbol 540. The effect of the interference filter on the optical spectrum of the ambient light is shown in FIG. 8.

Figure 9:
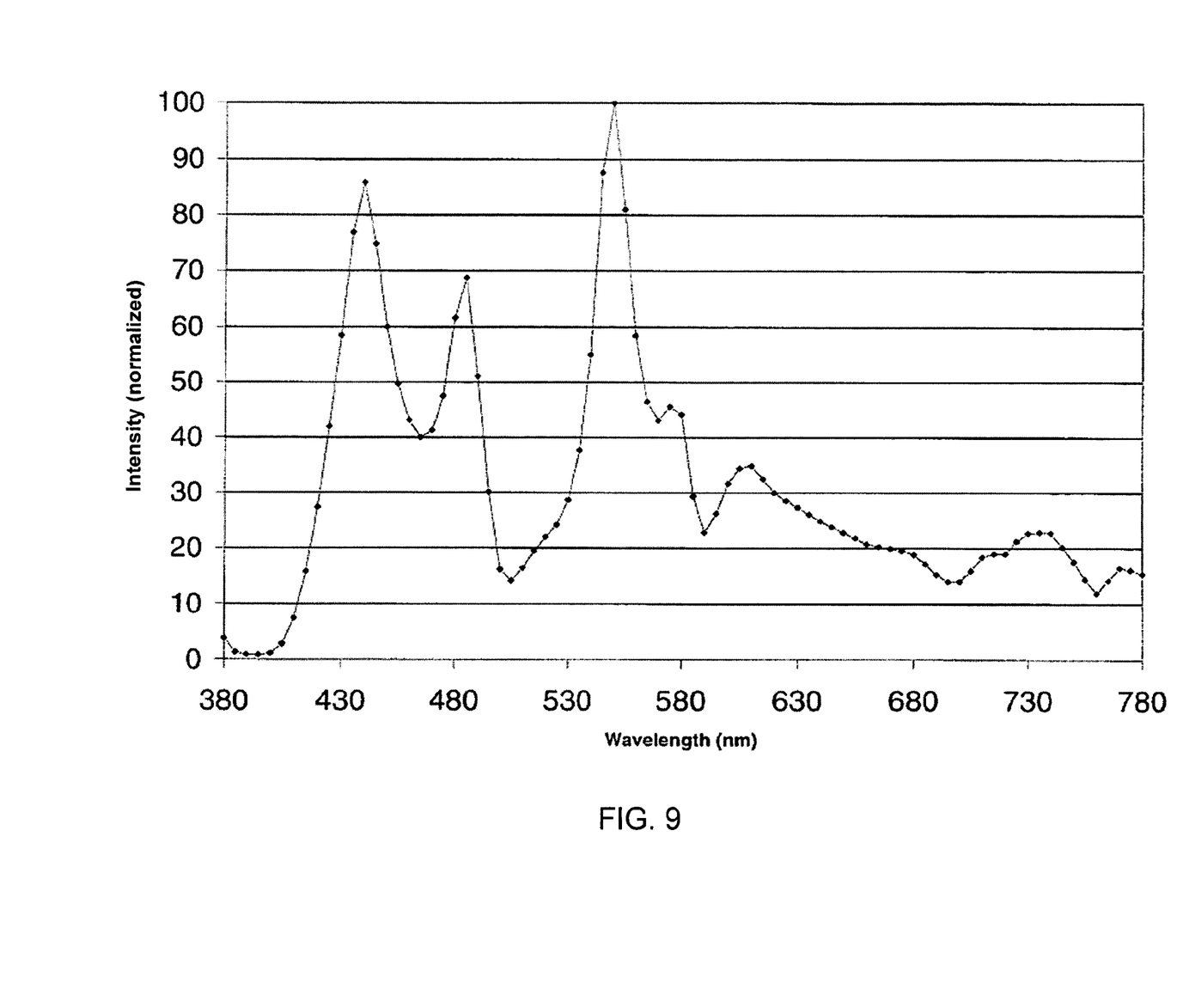
FIG. 9 shows an optical spectrum of a reflected image in the presence of ambient light filtered by the interference filter of FIG. 7.

When light projected by the PLZ-933 image projector 106 is in the presence of the interference filter-controlled ambient light and the projected light luminance relative to the interference filter-controlled ambient light luminance is at a 5:1 ratio, the optical spectrum of the reflected image (i.e., the combined projected light and the interference filter-controlled ambient light reflected by the screen 110 to the eye of the viewer) is as shown in FIG. 9. As compared to the optical spectrum of FIG. 5, the optical spectrum of FIG. 9 has a relatively higher intensity of light in the cyan spectral band (centered at about 485 nm) and the yellow spectral band (centered at about 580 nm). The color gamut of the reflected image is increased in the direction of the yellow side of the gamut, as represented by the triangle having open diamonds 552, 554, 556 at the vertices in FIG. 3. As can be seen, the color gamut of the reflected image in the presence of the interference-filter-controlled ambient light has more area (and is therefore larger) than in the presence of uncontrolled ambient light. The effect of this increase in area size is that, to the viewer 112, the colors of yellow green, greenish yellow, yellow, orange yellow, orange, and yellowish pink in the reflected image appear more saturated to the viewer even if the ambient light present in the room 102 is increased to maintain the 5:1 ratio when the reflected image is formed on the projection screen 110.

Figure 10:
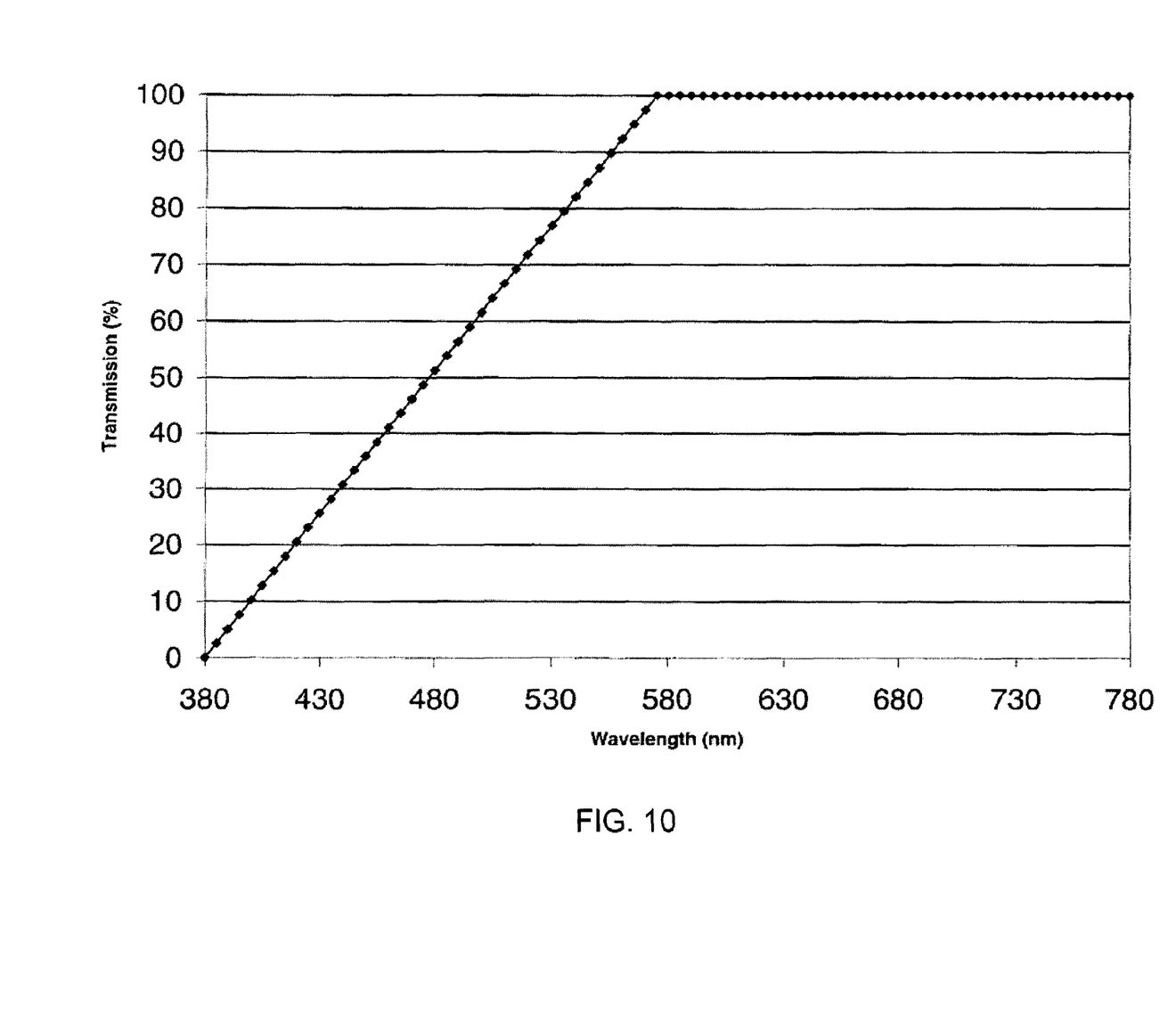
FIG. 10 shows a transmission curve of a linear filter.
Figure 11:
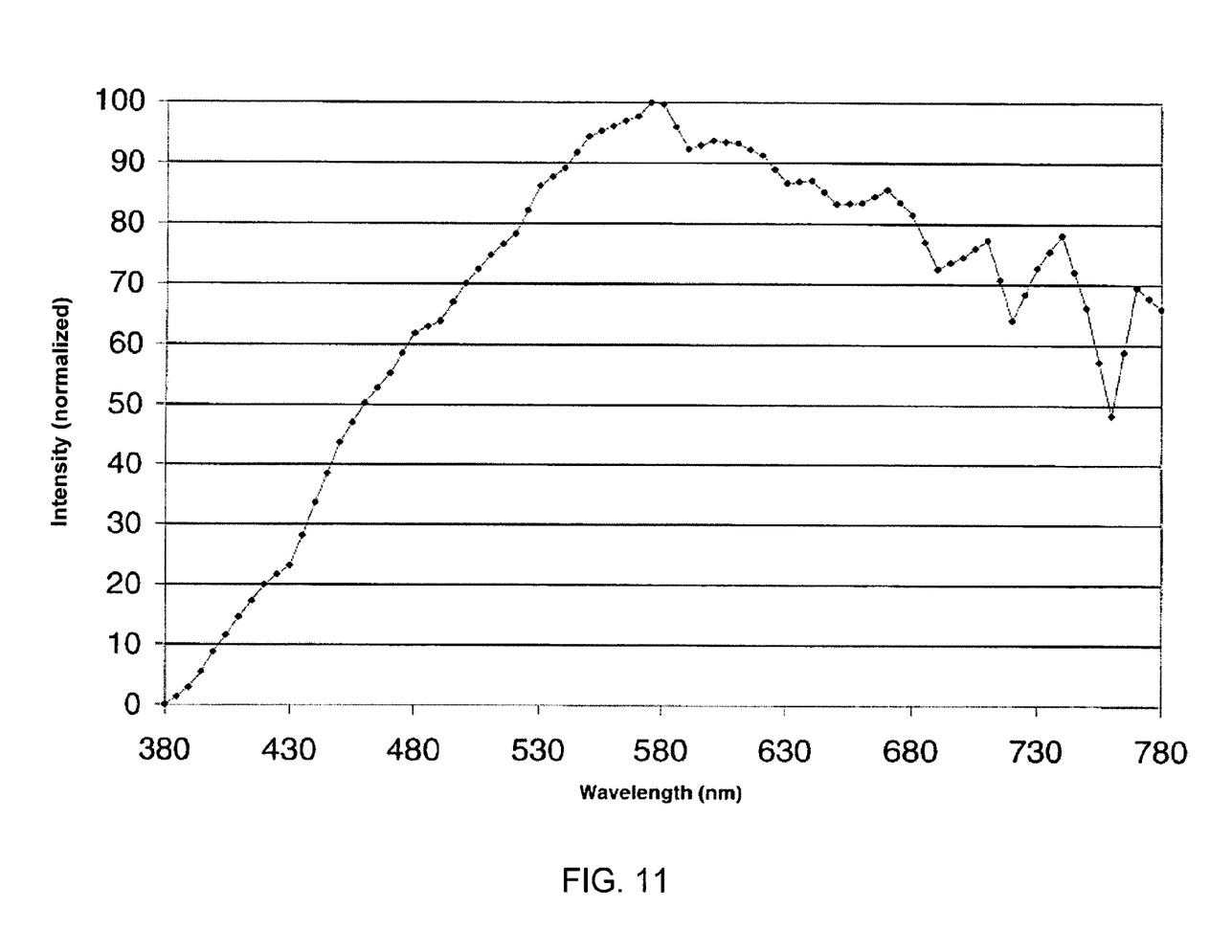
FIG. 11 shows an optical spectrum of ambient light filtered by the linear filter of FIG. 10.

Other filters can similarly be used to achieve this difference in the color gamut of the reflected image. In another example, the filter affixed to a window is a linear filter, such as a dyed-plastic film. FIG. 10 shows a transmission curve of a theoretical linear filter that is similar to commercially available filters, such as the Roscolux #11 dyed-plastic film available from Rosco USA. The transmission rate of light of such linear filters varies by color spectral band. In the illustrated example, the linear filter gradually increases the amount of light that is passed through the filter as the wavelength increases from 380 nm to approximately 580 nm, and passes 100% of light having wavelengths greater than 580 nm. The effect of such a linear filter on the optical spectrum of the ambient light is shown in FIG. 11.

Figure 12:
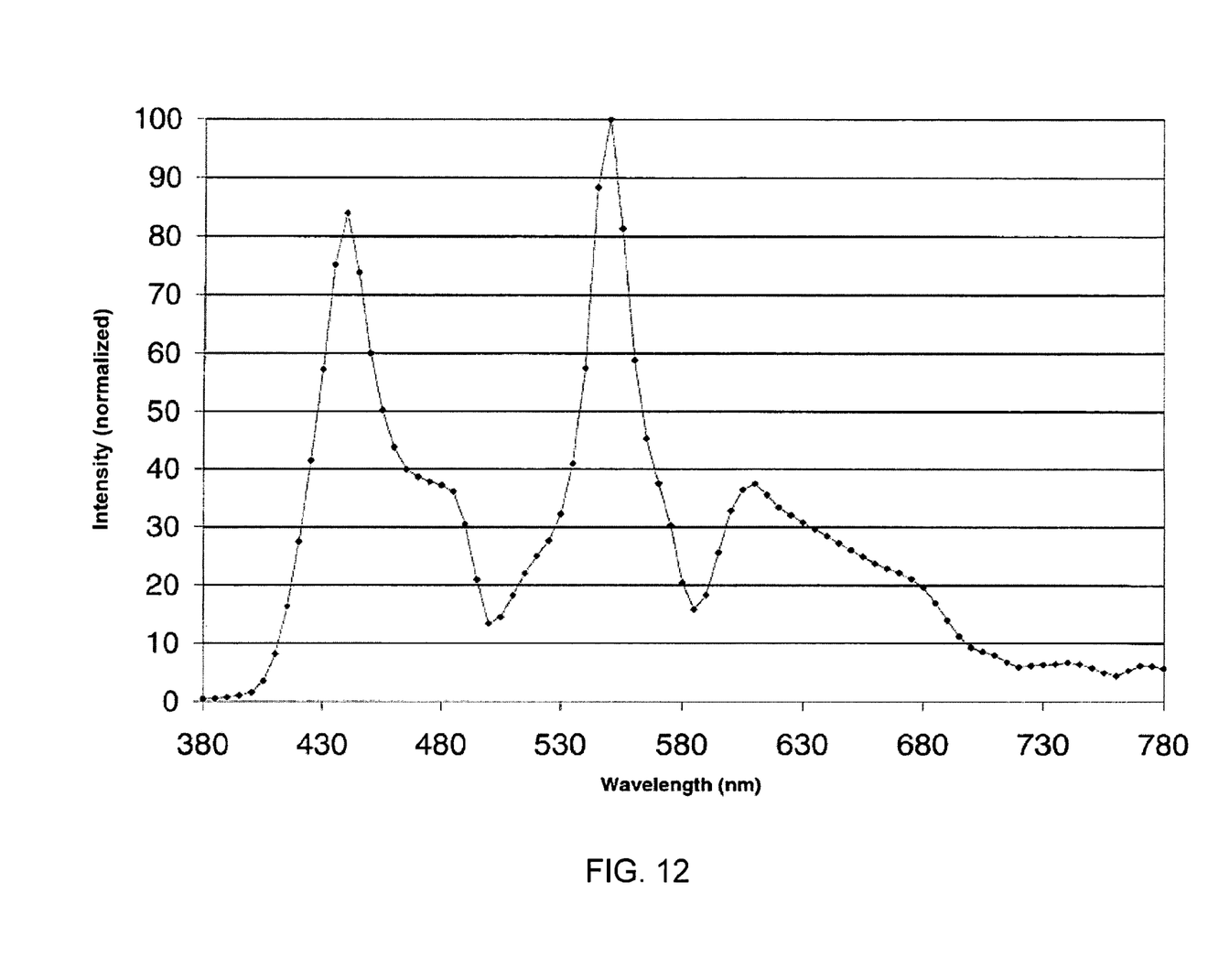
FIG. 12 shows an optical spectrum of a reflected image in the presence of ambient light filtered by the linear filter of FIG. 10.

When light projected by the PLZ-933 image projector 106 is in the presence of the ambient light filtered by the linear filter (also referred to as "linear filter-controlled ambient light") and the projected light luminance relative to the linear filter-controlled ambient light luminance is at a 5:1 ratio, the optical spectrum of the reflected image (i.e., the combined projected light and the linear-filter-controlled ambient light reflected by the screen 110 to the eye of the viewer) is as shown in FIG. 12. Although the optical spectrum of FIG. 12 is different from the optical spectrum of FIG. 9, the viewer's eye responds to the reduction of intensity in the violet spectral band (centered at about 400 nm), the blue spectral band (centered at about 470 nm) and the cyan spectral band (centered at about 485 nm) by shifting the weighted intensity distribution in the direction of the yellow side of the gamut, in a manner similar to an increase of intensity in the cyan spectral band (centered at about 485 nm) and the yellow spectral band (centered at about 580 nm) in the reflected image. The resulting color gamut can also be represented by the triangle 550 having open diamonds 552, 554, 556 at the vertices in FIG. 3.

In the examples described above, the source of ambient light is daylight and the filter is an interference filter or a linear filter. Different combinations of ambient light sources and types of filters may be used to improve the color gamut of the reflected image. The ambient light source can be an artificial light source, such as an incandescent light bulb, or a natural light source, such as daylight streaming through a window of a room. Filters are generally selected for use with a particular ambient light source so that the resultant color point of the controlled ambient light lies close to the black body curve. Identifying the optimal chromaticity coordinates of a controlled ambient light involves selecting a y-chromaticity coordinate value that balances the color on both the cyan and magenta sides of the triangle, while selecting an x-chromaticity coordinate value that improves the yellow side of the triangle without sacrificing too much of the blue side of the triangle.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
controlling ambient light to produce controlled ambient light having predefined optical spectrum characteristics in order to effect a modified color gamut of a reflected image that is reflected from a projector screen that reflects light of substantially all wavelengths so that the light of substantially all wavelengths contained in (a) the controlled ambient light and (b) a projected image reaches the eyes of a viewer after being reflected, the reflected image comprising reflected portions of the controlled ambient light and reflected portions of the projected image directed from an image projector to the projector screen, the reflected image having a first color gamut in the presence of uncontrolled ambient light, the reflected image having the modified color gamut in the presence of the controlled ambient light.

2. The method of claim 1, wherein the modified color gamut is larger than the first color gamut.

3. The method of claim 1, wherein the controlled ambient light effects the modified color gamut of the reflected image by increasing, relative to other color spectral bands, light intensity of preselected color spectral bands of the reflected image.

4. The method of claim 3, wherein the preselected color spectral bands are separated in a light spectrum.

5. The method of claim 3, wherein the preselected color spectral bands comprise a first color spectral band centered at about 485 nm and a second color spectral band centered at about 580 nm.

6. The method of claim 3, wherein the light intensity of the preselected color spectral bands are increased non-uniformly relative to each other.

7. The method of claim 1, wherein the projected image comprises light of predetermined color spectral bands.

8. The method of claim 7, wherein the projected image comprises light in a blue spectral band, light in a green spectral band, and light in a red spectral band.

9. The method of claim 1, wherein controlling the ambient light comprises:
filtering light from an ambient light source to produce the controlled ambient light.

10. The method of claim 9, wherein light from the ambient light source is filtered by an interference filter.

11. The method of claim 9, wherein light from the ambient light source is filtered by a linear filter.

12. A system comprising:
a projector screen that reflects light of substantially all wavelengths so that the light of substantially all wavelengths contained in (a) controlled ambient light and (b) a projected image reaches the eyes of a viewer after being reflected;
an image projector to provide the projected image; and
an element to control ambient light, from an ambient light source, to provide the controlled ambient light having predefined optical spectrum characteristics in order to effect a modified color gamut of a reflected image that is reflected from the projector screen, the reflected image comprising reflected portions of the controlled ambient light and reflected portions of the projected image directed from the image projector to the projector screen, the reflected image having a first color gamut in the presence of uncontrolled ambient light, the reflected image having a modified color gamut in the presence of the controlled ambient light.

13. The system of claim 12, wherein the modified color gamut is larger than the first color gamut.

14. The system of claim 12, wherein the element is substantially transmissive to ambient light of two color spectral bands that are separated in a light spectrum and is substantially non-transmissive of ambient light of other color spectral bands.

15. The system of claim 12, wherein the element is substantially transmissive to ambient light of a cyan spectral band and ambient light of a yellow spectral band.

16. The system of claim 12, wherein the element comprises an interference filter having a multilayer coating.

17. The system of claim 12, wherein the element comprises a linear filter having a transmission rate that varies according to color spectral band.

18. The system of claim 12, wherein the element controls the ambient light so as to produce controlled ambient light having color point chromaticity coordinates within predetermined ranges.

19. The system of claim 18, wherein a color point x chromaticity coordinate is within a range of 0.3<x<0.5.

20. The system of claim 18, wherein a color point y chromaticity coordinate is within 0.5 units of a black body curve.

21. A method comprising:
controlling ambient light to produce controlled ambient light having color point chromaticity coordinates within a predetermined range in order to effect a modified color gamut of a reflected image that is reflected from a projector screen, the reflected image comprising reflected portions of the controlled ambient light and reflected portions of a projected image directed from an image projector to the projector screen, the reflected image having a first color gamut in the presence of uncontrolled ambient light, the reflected image having the modified color gamut larger than the first color gamut in the presence of the controlled ambient light.

22. The method of claim 21, wherein an x chromaticity coordinate is within a range of 0.3<x<0.5.

23. The method of claim 21, wherein a y chromaticity coordinate is within 0.5 units of a black body curve.

24. The method of claim 21, wherein the controlled ambient light effects the modified color gamut of the reflected image by increasing, relative to other color spectral bands, light intensity of preselected color spectral bands of the reflected image.

25. The method of claim 24, wherein the preselected color spectral bands are separated in a light spectrum.

26. The method of claim 24, wherein the preselected color spectral bands comprise a first color spectral band centered at about 485 nm and a second color spectral band centered at about 580 nm.

27. The method of claim 24, wherein the light intensity of the preselected color spectral bands are increased non-uniformly relative to each other.

28. The method of claim 21, wherein the projected image comprises light of predetermined color spectral bands.

29. The method of claim 28, wherein the projected image comprises light in a blue spectral band, light in a green spectral band, and light in a red spectral band.

30. The method of claim 21, wherein controlling the ambient light comprises: filtering light from an ambient light source to produce the controlled ambient light.

31. The method of claim 30, wherein light from the ambient light source is filtered by an interference filter.

32. The method of claim 30, wherein light from the ambient light source is filtered by a linear filter.

33. The method of claim 21, wherein the projector screen reflects light of substantially all wavelengths.

34. A system comprising:
an image projector to provide projected light; and
an element to control ambient light to produce controlled ambient light having color point chromaticity coordinates within a predetermined range in order to effect a modified color gamut of a reflected image that is reflected from a screen, the reflected image comprising reflected portions of the controlled ambient light and reflected portions of a projected image directed from an image projector to the screen, the reflected image having a first color gamut in the presence of uncontrolled ambient light, the reflected image having the modified color gamut larger than the first color gamut in the presence of the controlled ambient light.

35. The system of claim 34, wherein an x chromaticity coordinate is within a range of 0.3<x<0.5.

36. The system of claim 34, wherein a y chromaticity coordinate is within 0.5 units of a black body curve.

37. The system of claim 34, wherein the element is substantially transmissive to ambient light of two color spectral bands that are separated in a light spectrum and is substantially non-transmissive of ambient light of other color spectral bands.

38. The system of claim 34, wherein the element is substantially transmissive to ambient light of a cyan spectral band and ambient light of a yellow spectral band.

39. The system of claim 34, wherein the element comprises an interference filter having a multilayer coating.

40. The system of claim 34, wherein the element comprises a linear filter having a transmission rate that varies according to color spectral band.

41. The system of claim 34, wherein the screen reflects light of substantially all wavelengths.

* * * * *